(12) United States Patent
Gomadam et al.

(10) Patent No.: US 8,457,236 B2
(45) Date of Patent: Jun. 4, 2013

(54) FEEDBACK STRATEGIES FOR MULTI-USER MIMO COMMUNICATION SYSTEMS

(75) Inventors: Krishna Srikanth Gomadam, Sunnyvale, CA (US); Daniel Yellin, Ra'anana (IL); Yu-Ngok Li, Oakland, CA (US)

(73) Assignee: Marvell World Trade Ltd., St. Michael (BB)

( * ) Notice: Subject to any disclaimer, the term of this patent is extended or adjusted under 35 U.S.C. 154(b) by 516 days.

(21) Appl. No.: 12/723,645

(22) Filed: Mar. 14, 2010

(65) Prior Publication Data

US 2010/0254474 A1 Oct. 7, 2010

Related U.S. Application Data

(60) Provisional application No. 61/167,066, filed on Apr. 6, 2009.

(51) Int. Cl.
*H04B 7/02* (2006.01)

(52) U.S. Cl.
USPC ........... 375/267; 375/260; 375/347; 375/349; 375/346; 455/101; 455/500; 455/134; 455/135

(58) Field of Classification Search
USPC .......... 375/260, 267, 347, 349, 346; 455/101, 455/500, 134, 135
See application file for complete search history.

(56) References Cited

U.S. PATENT DOCUMENTS

| | | | |
|---|---|---|---|
| 5,231,629 A | 7/1993 | Kotzin et al. | |
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,751,368 B2 * | 7/2010 | Li et al. | 370/332 |

(Continued)

FOREIGN PATENT DOCUMENTS

| | | |
|---|---|---|
| EP | 2182754 A1 | 5/2010 |
| JP | 2008147792 A | 6/2008 |
| WO | 2007133564 A3 | 11/2007 |
| WO | 2008009157 A1 | 1/2008 |

OTHER PUBLICATIONS

Lee W. Young; Written Opinion of the International Searching Authority; Patent Cooperation Treaty; Sep. 21, 2010; International application No. PCT/IB 10/51088.

(Continued)

*Primary Examiner* — Daniel Washburn
*Assistant Examiner* — Rahel Guarino

(57) ABSTRACT

A method for signal processing in a receiver includes receiving in the receiver a Multi-User Multiple-Input Multiple-Output (MU-MIMO) signal. The MU-MIMO signal includes at least a first signal, which is precoded using a first precoding scheme and is addressed to the receiver, and a second signal, which is precoded using a second precoding scheme. An average error rate achievable in decoding the first signal in the presence of the second signal is computed. The average error rate is computed over a set of possible choices of the second precoding scheme. The first precoding scheme is selected from among a plurality of available precoding schemes so as to satisfy a criterion defined over the average error rate. The receiver sends feedback to a transmitter transmitting the first signal. The feedback depends on the selected first precoding scheme and causes the transmitter to control transmission of the first signal.

18 Claims, 2 Drawing Sheets

U.S. PATENT DOCUMENTS

| | | | |
|---|---|---|---|
| 7,839,944 | B2 | 11/2010 | Lee et al. |
| 8,036,286 | B2 | 10/2011 | Lee et al. |
| 8,068,555 | B2 | 11/2011 | Jongren et al. |
| 8,098,750 | B2 | 1/2012 | Mueck et al. |
| 8,179,775 | B2 | 5/2012 | Chen et al. |
| 2003/0035491 | A1 | 2/2003 | Walton et al. |
| 2005/0141630 | A1* | 6/2005 | Catreux et al. ............... 375/267 |
| 2005/0157810 | A1 | 7/2005 | Raleigh et al. |
| 2005/0237920 | A1 | 10/2005 | Howard et al. |
| 2005/0250544 | A1 | 11/2005 | Grant et al. |
| 2006/0014554 | A1 | 1/2006 | Gerlach |
| 2006/0056538 | A1 | 3/2006 | Nam et al. |
| 2006/0093060 | A1 | 5/2006 | Jung et al. |
| 2006/0153112 | A1 | 7/2006 | Lim et al. |
| 2006/0203777 | A1 | 9/2006 | Kim et al. |
| 2006/0233131 | A1 | 10/2006 | Gore et al. |
| 2006/0276212 | A1 | 12/2006 | Sampath et al. |
| 2007/0058746 | A1 | 3/2007 | Gueguen |
| 2007/0099578 | A1 | 5/2007 | Adeney et al. |
| 2007/0149229 | A1 | 6/2007 | Frederiksen et al. |
| 2007/0160162 | A1 | 7/2007 | Kim et al. |
| 2007/0165738 | A1 | 7/2007 | Barriac et al. |
| 2007/0223422 | A1 | 9/2007 | Kim et al. |
| 2007/0230373 | A1 | 10/2007 | Li et al. |
| 2007/0253386 | A1 | 11/2007 | Li et al. |
| 2007/0270170 | A1 | 11/2007 | Yoon et al. |
| 2008/0013610 | A1* | 1/2008 | Varadarajan et al. ......... 375/221 |
| 2008/0039067 | A1 | 2/2008 | Jin et al. |
| 2008/0080364 | A1 | 4/2008 | Barak et al. |
| 2008/0080632 | A1 | 4/2008 | Kim et al. |
| 2008/0080634 | A1 | 4/2008 | Kotecha et al. |
| 2008/0080635 | A1 | 4/2008 | Hugl et al. |
| 2008/0080637 | A1 | 4/2008 | Khan et al. |
| 2008/0095258 | A1 | 4/2008 | She et al. |
| 2008/0101407 | A1 | 5/2008 | Khan et al. |
| 2008/0108310 | A1 | 5/2008 | Tong et al. |
| 2008/0112351 | A1 | 5/2008 | Surineni et al. |
| 2008/0130778 | A1 | 6/2008 | Xia et al. |
| 2008/0232494 | A1 | 9/2008 | Pan et al. |
| 2008/0232503 | A1 | 9/2008 | Kim |
| 2008/0247364 | A1 | 10/2008 | Kim et al. |
| 2008/0247475 | A1 | 10/2008 | Kim et al. |
| 2008/0268855 | A1 | 10/2008 | Hanuni et al. |
| 2008/0268887 | A1 | 10/2008 | Jansen et al. |
| 2008/0292013 | A1 | 11/2008 | Varadarajan et al. |
| 2008/0298452 | A1 | 12/2008 | Sampath et al. |
| 2008/0298482 | A1 | 12/2008 | Rensburg et al. |
| 2008/0318606 | A1 | 12/2008 | Tsutsui et al. |
| 2009/0016263 | A1 | 1/2009 | Kishigami et al. |
| 2009/0046800 | A1 | 2/2009 | Xu et al. |
| 2009/0122857 | A1 | 5/2009 | Li et al. |
| 2009/0180561 | A1 | 7/2009 | Kim et al. |
| 2009/0296844 | A1 | 12/2009 | Ihm et al. |
| 2010/0015967 | A1 | 1/2010 | Perets et al. |
| 2010/0034308 | A1 | 2/2010 | Kim et al. |
| 2010/0035627 | A1 | 2/2010 | Hou et al. |
| 2010/0054354 | A1 | 3/2010 | Tosato |
| 2010/0056170 | A1 | 3/2010 | Lindoff et al. |
| 2010/0061477 | A1 | 3/2010 | Lee et al. |
| 2010/0103834 | A1 | 4/2010 | Gorokhov et al. |
| 2010/0158151 | A1 | 6/2010 | Krauss et al. |
| 2010/0172424 | A1 | 7/2010 | Perets et al. |
| 2010/0172430 | A1 | 7/2010 | Melzer et al. |
| 2010/0173639 | A1 | 7/2010 | Li et al. |
| 2010/0215112 | A1 | 8/2010 | Tsai et al. |
| 2010/0220800 | A1 | 9/2010 | Erell et al. |
| 2010/0238984 | A1 | 9/2010 | Sayana et al. |
| 2010/0260234 | A1 | 10/2010 | Thomas et al. |
| 2010/0260243 | A1 | 10/2010 | Ihm et al. |
| 2010/0267341 | A1 | 10/2010 | Bergel et al. |
| 2010/0271968 | A1 | 10/2010 | Liu et al. |
| 2010/0278278 | A1 | 11/2010 | Lee et al. |
| 2010/0284484 | A1 | 11/2010 | Jongren et al. |
| 2010/0290548 | A1 | 11/2010 | Hoshino et al. |
| 2011/0019631 | A1 | 1/2011 | Kotecha et al. |
| 2011/0058621 | A1 | 3/2011 | Clerckx et al. |
| 2011/0064156 | A1 | 3/2011 | Kim et al. |
| 2011/0080969 | A1 | 4/2011 | Jongren et al. |
| 2011/0085610 | A1 | 4/2011 | Zhuang et al. |
| 2011/0110403 | A1 | 5/2011 | Jongren |
| 2011/0164701 | A1 | 7/2011 | Nikopourdeilami et al. |
| 2011/0194594 | A1 | 8/2011 | Noh et al. |
| 2011/0194644 | A1 | 8/2011 | Liu et al. |
| 2011/0205930 | A1 | 8/2011 | Rahman et al. |
| 2011/0250919 | A1 | 10/2011 | Barbieri et al. |
| 2011/0268204 | A1 | 11/2011 | Choi et al. |
| 2012/0069887 | A1 | 3/2012 | Park et al. |
| 2012/0069917 | A1 | 3/2012 | Liu et al. |
| 2012/0087425 | A1 | 4/2012 | Gomadam et al. |
| 2012/0087435 | A1 | 4/2012 | Gomadam et al. |
| 2012/0134434 | A1 | 5/2012 | Chen et al. |
| 2012/0219042 | A1 | 8/2012 | Onggosanusi et al. |
| 2012/0219083 | A1 | 8/2012 | Tong et al. |
| 2013/0028068 | A1 | 1/2013 | Park et al. |
| 2013/0028344 | A1 | 1/2013 | Chen et al. |
| 2013/0039284 | A1 | 2/2013 | Marinier et al. |

OTHER PUBLICATIONS

Motorola, "Interference Mitigation via Power Control and FDM Resource Allocation and UE Alignment for E-UTRA Uplink and TP", 3GPP TSG RAN1 #44, Denver, USA, Feb. 13-17, 2006.

Rapporteur (NTT DOCoMo), "Text proposal for RAN1 TR on LTE-Advanced", 3GPP TSG RAN WG1 Meeting #53bis, Warsaw, Poland, Jun. 30-Jul. 4, 2008.

International Application PCT/IB2009/052987 Search Report dated Jan. 27, 2010.

International Application PCT/IB2009/052726 Search Report dated Jan. 28, 2010.

Texas Instruments, "Codebook Design for E-UTRA MIMO Precoding", 3GPP TSG RAN WG1 46bis, Seoul, Korea, Oct. 9-13, 2006.

Samsung, "Codebook based Precoding for 8 Tx Transmission in LTE-A", 3GPP TSG RAN WG1 Meeting #55, Prague, Czech Republic, Nov. 10-14, 2008.

Qualcomm Europe, "Link Analysis for 4×2 and 4×4 Precoder Set Decision", 3GPP TSG-RAN WG1 #48bis, St. Julian's, Malta, Mar. 26-30, 2007.

3GPP TS 36.211 V8.4.0, "3rd Generation Partnership Project; Technical Specification Group Radio Access Network; Evolved Universal Terrestrial Radio Access (E-UTRA); Physical Channels and Modulation (Release 8)", Sophia Antipolis, France, Sep. 2008.

3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.

Samsung, "CQI reporting for MU-MIMO", 3GPP TSG RAN WG1 Meeting #54, Jeju, Korea, Aug. 18-22, 2008.

Motorola, "Some Results on DL-MIMO Enhancements for LTE-A", TSG-RAN WG1 #55bis, Ljubljana, Slovenia, Jan. 12-16, 2009.

Alcatel-Lucent, ""Best Companion" reporting for improved single-cell MU-MIMO pairing", 3GPP TSG RAN WG1 #56 Meeting, Athens, Greece, Feb. 9-13, 2009.

3GPP TS 25.214 V8.5.0, 3rd Generation Partnership Project; Technical Specification Group Radio Access Network; Physical Layer Procedures (FDD) (Release 8), Sophia Antipolis, France, Mar. 2009.

Alcatel-Lucent, "Fractional power Control using Pilot Power Ratio Measurements for the E-UTRA Uplink", 3GPP TSG-RAN WG1 #48, St. Louis, USA, Feb. 12-16, 2007.

LG Electronics, "Consideration of DL-MIMO in LTE-Advanced", 3GPP TSG RAN WG1 Meeting #55, Prague, Czech Republic, Nov. 10-14, 2008.

Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.

"RAN1 Chairman Notes", 3GPP TSG RAN WG1 Meeting #55bis, Ljubljana, Slovenia, Jan. 12-16, 2009.

Qualcomm Europe, "Downlink RS Structure in Support of Higher-Order MIMO", 3GPP TSG RAN WG1 Meeting #57, San Francisco, USA, May 4-8, 2009.

China Mobile et al., "Framework for LTE PDSCH DRS Demodulation Requirements", 3GPP TSG RAN WG4 Meeting #49, Prague, Czech Republic, Nov. 10-14, 2008.
Hanzo et al., "OFDM and MCCDMA for Broadband Multi-User Communications, WLANs and Broadcasting", Wiley-IEEE Press, chapter 14, pp. 485-548, Sep. 19, 2003.
Perets et al., U.S. Appl. No. 12/477,152 "Efficient MIMO Transmission Schemes" filed on Jun. 3, 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
Bergel et al., U.S. Appl. No. 61/111,475 "Channel Feedback Schemes for LTE Advanced" filed on Nov. 5, 2008.
Erell et al., U.S. Appl. No. 12/493,252 "Signaling of DRS Precoding Granularity" filed on Jun. 29, 2009.
3GPP TS 36.213 V8.6.0, "3rd Generation Partnership Project; Technical Specification Group Radio Access Network; Evolved Universal Terrestrial Radio Access (E-UTRA); Physical Layer Procedures (Release 8)", Sophia Antipolis, France, Mar. 2009.
Xia et al., "Design and Analysis of Transmit—Beamforming based on Limited-Rate Feedback", IEEE Transaction on Signal Processing (Draft), Mar. 16, 2005.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1#56bis, Seoul, Republic of Korea, Mar. 23-27, 2009.
Huawei, "Adaptive Codebook Designs for MU-MIMO", 3GPP TSG RAN WG1 meeting #56bis, Seoul, Republic of Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 meeting #57, San Francisco, CA USA May 3-8, 2009.
Ericsson, "CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
NTT Docomo et al., "Prioritized Deployment Scenarios for LTE-Advanced Studies", 3GPP TSG RAN WG4 Meeting #50, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.

3rd Generation Partnership Project; Technical Specification Group Radio Access Network; Further Advancements for E-UTRA Physical Layer Aspects (Release 9), 3GPP TR 36.814 V0.4.1, Sophia Antipolis, France, Feb. 2009.
Ericsson, "Carrier Aggregation in LTE-Advanced", TSG-RAN WG1 #53bis, Warsaw, Poland, Jun. 30-Jul. 4, 2008.
Huawei, "The Impact of CA on Mobility in LTE-A", 3GPP TSG RAN WG1 Meeting #56, Athens, Greece, Feb. 9-13, 2009.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
U.S. Appl. No. 61/111,475, filed Nov. 5, 2008.
Sharif et al., "On the Capacity of MIMO Broadcast Channels with Partial Side Information," IEEE Transactions on Information Theory, vol. 51, No. 2, pp. 506-522, Feb. 2005.
Viswanath et al., "Opportunistic Beamforming Using Dumb Antennas," IEEE Transactions on Information Theory, vol. 48, No. 6, pp. 1277-1294, Jun. 2002.
International Application PCT/IB2010/051088 Search Report dated Sep. 21, 2010.
International Application PCT/IB2010/053272 Search report dated Dec. 27, 2010.
Lucent Technologies, "Link Error Prediction for E-DCH", TSG-RAN WG1#35, Lisbon, Portugal, Nov. 17-21, 2003.
Samsung, "Codebook Design for 8 Tx Transmission in LTE-A", 3GPP TSG RAN WG1 Meeting #56, Athens, Greece, Feb. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
Samsung, "Discussion on Enhanced DL Beamforming", 3GPP TSG RAN WG1 Meeting #56bis, Seoul, Korea, Mar. 23-27, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
U.S. Appl. No. 61/294,737, filed Mar. 13, 2010.
U.S. Appl. No. 61/321,386, filed Apr. 6, 2010.
U.S. Appl. No. 12/902,168, filed Oct. 12, 2010.
U.S. Appl. No. 12/965,878, filed Dec. 12, 2010.
U.S. Appl. No. 12/838,509, filed Jul. 19, 2010.
U.S. Appl. No. 12/903,237, filed Oct. 13, 2010.
U.S. Appl. No. 13/023,555, filed Feb. 9, 2011.
U.S. Appl. No. 13/052,075, filed Mar. 20, 2011.
Ericsson, "On Channel Reciprocity for Enhanced DL Multi-Antenna Transmission", TSG-RAN WG1 #59, Jeju, Korea, Nov. 9-13, 2009.
Motorola, "Low-Overhead Feedback of Spatial Covariance Matrix", TSG-RAN WG1 #59, Jeju, Korea, Nov. 9-13, 2009.

Motorola, "Use of UL Covariance for Downlink MIMO in FDD", TSG-RAN WG1 #59, Jeju, Korea, Nov. 9-13, 2009.
Alcatel-Lucent Shanghai Bell, "Correlation-based Explicit Feedback", 3GPP TSG RAN WG1 Meeting # 59bis, Valencia, Spain, Jan. 18-22, 2010.
Motorola, "Codebook for 8Tx DL SU-MIMO for LTE-1", TSG-RAN WG1 #59, Jeju, Korea, Nov. 9-13, 2009.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Marvell, "Codebook Adaptation for ULA Antenna", 3GPP TSG RAN WG1 Meeting #60, San Francisco, USA, Feb. 22-26, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
U.S. Appl. No. 12/983,898, filed Jan. 4, 2011.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
Lee W. Young; Written Opinion of the International Searching Authority; Patent Cooperation Treaty; Jan. 28, 2010; International application No. PCT/IB 09/52726.
Lee W. Young; Written Opinion of the International Searching Authority; Patent Cooperation Treaty; Jul. 15, 2010; International application No. PCT/IB 10/50797.
Lee W. Young; Written Opinion of the International Searching Authority; Patent Cooperation Treaty; Jun. 15, 2010; international application No. PCT/IB 10/50014.
Lee W. Young; Written Opinion of the international Searching Authority; Patent Cooperation Treaty; Jul. 9, 2010; International application No. PCT/IB 10/51089.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for REL.10 DL MIMO", 3GPP TSG RAN # 62 Meeting, Madrid, Spain, Aug. 23-27, 2010.
Alcatel-Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec. 7-10, 2010.
Alcatel-Lucent et al., "Way Forward on CSI Feedback for Rel.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
Zte, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737, filed Jan. 10, 2012.
U.S. Appl. No. 13/433,293, filed Mar. 29, 2012.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 12/477,152 Official Action dated Jun. 26, 2012.
International Application PCT/IB2012/051511 Search Report dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
U.S. Appl. No. 13/252,218 Office Action dated Apr. 11, 2013.

* cited by examiner

US 8,457,236 B2

FEEDBACK STRATEGIES FOR MULTI-USER MIMO COMMUNICATION SYSTEMS

CROSS-REFERENCE TO RELATED APPLICATIONS

This application claims the benefit of U.S. Provisional Patent Application 61/167,066, filed Apr. 6, 2009, whose disclosure is incorporated herein by reference.

FIELD OF THE DISCLOSURE

The present disclosure relates generally to communication systems, and particularly to methods and systems for communication using multiple antennas.

BACKGROUND

Some communication systems transmit data from a transmitter to a receiver over multiple communication channels, using multiple transmit antennas and multiple receive antennas. Multiple-channel transmission is used, for example, in spatial multiplexing schemes that achieve high throughput, in beam-forming schemes that achieve high antenna directivity and in spatial diversity schemes that achieve high resilience against channel fading and multipath. These schemes are often referred to collectively as Multiple-Input Multiple-Output (MIMO) schemes.

MIMO schemes are contemplated, for example, for use in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.6.0, March, 2009, which is incorporated herein by reference. The 3GPP is currently in the process of specifying an extension of the E-UTRA specification, which is referred to as LTE-Advanced (LTE-A).

Multi-User MIMO (MU-MIMO) is a transmission scheme in which a transmitter transmits MIMO signals simultaneously to two or more different receivers, using spatial multiplexing. Several aspects of the potential use of MU-MIMO in LTE-A are discussed, for example, in "CQI Reporting for MU-MIMO," 3GPP TSG RAN WG1 Meeting #54, Document R1-082874, Jeju, Korea, Aug. 18-22, 2008; in "Some Results on DL-MIMO Enhancements for LTE-A," 3GPP TSG RAN WG1 Meeting #55, Document R1-090328, Ljubljana, Slovenia, Jan. 12-16, 2009; and in "'Best Companion' Reporting for Improved Single-Cell MU-MIMO Pairing, 3GPP TSG RAN WG1 Meeting #56, Document R1-090926, Athens, Greece, Feb. 9-13, 2009, which are incorporated herein by reference.

The description above is presented as a general overview of related art in this field and should not be construed as an admission that any of the information it contains constitutes prior art against the present patent application.

SUMMARY

An embodiment that is described herein provides a method for signal processing in a receiver. The method includes receiving in the receiver a Multi-User Multiple-Input Multiple-Output (MU-MIMO) signal. The MU-MIMO signal includes at least a first signal, which is precoded using a first precoding scheme and is addressed to the receiver, and a second signal, which is precoded using a second precoding scheme. An average error rate achievable in decoding the first signal in the presence of the second signal is computed. The average error rate is computed over a set of possible choices of the second precoding scheme. The first precoding scheme is selected from among a plurality of available precoding schemes so as to satisfy a criterion defined over the average error rate. The receiver sends feedback to a transmitter transmitting the first signal. The feedback depends on the selected first precoding scheme and causes the transmitter to control transmission of the first signal.

In some embodiments, sending the feedback includes sending a request to precode the first signal using the selected first precoding scheme. In an embodiment, sending the feedback includes sending a Channel Quality Index (CQI), which is computed based on the selected first precoding scheme. In another embodiment, sending the feedback includes causing the transmitter to modulate and encode the first signal based on the feedback. In yet another embodiment, sending the feedback includes causing the transmitter to schedule the transmission of the first signal based on the feedback. In some embodiments, the method further includes configuring the feedback at the receiver based on instructions received from the transmitter.

In a disclosed embodiment, selecting the first precoding scheme includes choosing the first precoding scheme that minimizes the average error rate over the plurality of the available precoding schemes. In another embodiment, selecting the first precoding scheme includes choosing the first precoding scheme that achieves a maximum throughput among a subset of the available precoding schemes that do not exceed a predefined average error rate value. In yet another embodiment, computing the average error rate includes calculating respective Signal to Interference and Noise Ratios (SINRs) for a given first precoding scheme and for the possible choices of the second precoding scheme, mapping the SINRs to respective error rates, and averaging the error rates.

In still another embodiment, computing the average error rate includes calculating the average error rate over only a subset of the possible choices of the second precoding scheme. In a disclosed embodiment, calculating the average error rate includes assigning respective ranks to the possible choices of the second precoding scheme, and including in the subset one or more of the possible choices having median values of the ranks.

There is additionally provided, in accordance with an embodiment that is described herein, a communication apparatus that includes a receiver, a processor and a feedback transmitter. The receiver is configured to receive a Multi-User Multiple-Input Multiple-Output (MU-MIMO) signal including at least a first signal, which is precoded using a first precoding scheme and is addressed to the receiver, and a second signal, which is precoded using a second precoding scheme. The processor is configured to compute an average error rate achievable in decoding the first signal in the presence of the second signal, wherein the average error rate is computed over a set of possible choices of the second precoding scheme, and to select the first precoding scheme from among a plurality of available precoding schemes so as to satisfy a criterion defined over the average error rate. The feedback transmitter is configured to transmit feedback that depends on the selected first precoding scheme, for controlling transmission of the first signal. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
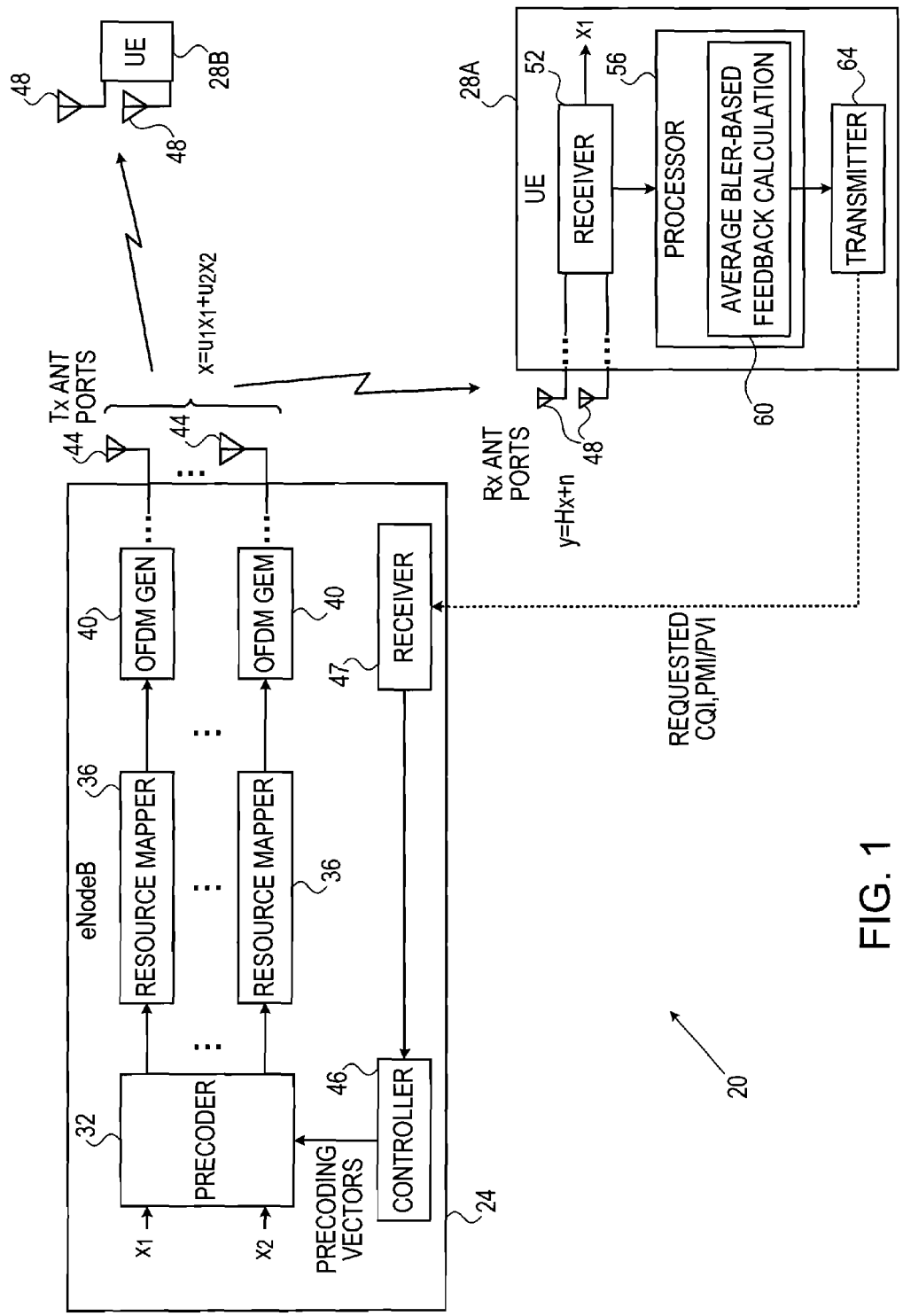
FIG. 1 is a block diagram that schematically illustrates a Multi-User Multiple-Input Multiple-Output (MU-MIMO) communication system, in accordance with an embodiment that is described herein.

In a typical Multi-User Multiple-Input Multiple-Output (MU-MIMO) scenario, a transmitter transmits a MU-MIMO signal, which comprises multiple signals that are addressed to multiple respective receivers. Each of the signals is precoded with a respective precoding scheme, and the signals are spatially-multiplexed and transmitted in the same time-frequency slot. In some MU-MIMO systems, each receiver evaluates the channel quality based on the received MU-MIMO signal, and sends to the transmitter feedback information derived from the evaluated channel. The transmitter uses the feedback information, for example in selecting the appropriate precoding schemes to be applied in subsequent transmissions.

In practice, however, evaluating the channel quality is a difficult task in MU-MIMO scenarios. Reliable channel evaluation in a given receiver should differentiate between the signal addressed to this receiver and the signals addressed to other receivers, which are regarded as interference. In many cases, however, a given receiver is unable to make this differentiation because it has no information as to the precoding schemes used in the signals addressed to the other receivers. As a result, the feedback information sent from the receiver may be distorted, and the selection of precoding schemes by the transmitter may be incorrect or at least non-optimal.

Embodiments that are described herein provide improved methods and apparatus for estimating channel quality and calculating receiver feedback in MU-MIMO systems. In some embodiments, a receiver receives a MU-MIMO signal that includes at least first and second signals. The first signal is precoded using a first precoding scheme and is addressed to this receiver, while the second signal is precoded using a second precoding scheme and is addressed to another receiver.

The receiver selects the first precoding scheme from among a plurality of available precoding schemes (e.g., from a predefined codebook) so as to satisfy a criterion defined over the achievable Block Error Rate (BLER) in decoding the first signal in the presence of the second signal. The average BLER is computed over a set of possible choices of the second precoding scheme, i.e., over a set of precoding schemes that potentially cause interference to reception of the first signal. In an embodiment, the receiver sends feedback to the transmitter, which feedback depends on the selected first precoding scheme.

In other words, in an embodiment, a given receiver selects a precoding scheme that meets a certain average BLER criterion, e.g., BLER$\leq$0.1. The average BLER is computed over multiple possible choices of precoding schemes that, if used to precode the signals addressed to other receivers, potentially cause interference to the signal addressed to the given receiver. When more than one precoding scheme meets this criterion, the receiver chooses the precoding scheme that achieves the highest throughput. The transmitter may use the feedback sent by the receiver in various ways, such as in selecting the precoding scheme for subsequent transmissions, selecting the Modulation and Coding Scheme (MCS) for subsequent transmissions, and/or scheduling subsequent transmissions.

The methods and systems described herein calculate the receiver feedback in a manner that reliably accounts for potential interference from other signals in the MU-MIMO signal. Therefore, transmitter decisions (e.g., precoding scheme selection, MCS selection and/or scheduling decisions) based on this feedback are also reliable and accurate, and the overall system performance is improved. In some MU-MIMO applications, the required system performance is specified in terms of average BLER. Since the disclosed techniques calculate the receiver feedback based on an average BLER criterion, they explicitly optimize the actual performance figure-of-merit specified for the system.

FIG. 1 is a block diagram that schematically illustrates a Multi-User Multiple-Input Multiple-Output (MU-MIMO) communication system 20, in accordance with an embodiment that is described herein. System 20 comprises a transmitter, in the present example an LTE-A eNodeB 24, which transmits MU-MIMO signals to two receivers, in the present example comprising LTE-A compliant User Equipments (UEs) 28A and 28B. Although the description that follows refers to LTE-A eNodeBs and UEs, the methods and systems described herein can also be used in any other communication systems that employs MU-MIMO.

In the example of FIG. 1, eNodeB 24 transmits downlink signals to UEs 28A and 28B simultaneously in the same time-frequency slot, using spatial multiplexing. The signal addressed to UE 28A is denoted $x_1$, and the signal addressed to UE 28A is denoted $x_2$. Each of signals $x_1$ and $x_2$ comprises a sequence of modulated symbols, which carry data addressed to respective UE. Any suitable modulation scheme, such as Quadrature Phase Shift Keying (QPSK) or Quadrature Amplitude Modulation (QAM), can be used. The data conveyed by each signal is typically encoded with an Error Correction Code (ECC). The choice of modulation and ECC used in a given signal is referred to as a Modulation and Coding Scheme (MCS).

A precoder 32 maps each of signals $x_1$ and $x_2$ onto m transmission channels, corresponding to m transmit (Tx) antenna ports 44 of the eNodeB. Precoder 32 applies a certain precoding operation to signal $x_1$. The precoding defines the relative magnitudes and phases at which signal $x_1$ is to be transmitted by the different Tx antenna ports. The precoder applies another precoding operation to signal $x_2$, which is generally different from the precoding operation applied to signal $x_1$.

The precoding operations are typically represented using precoding matrices or vectors. The description that follows refers to precoding vectors. Generally, however, any suitable representation of the precoding operation can be used. In the present example, eNodeB 24 has four Tx antenna ports, i.e., m=4. Alternatively, however, any other suitable number of Tx antenna ports, such as m=8, can also be used. Note that a given antenna port may not necessarily correspond to a single physical antenna, but may correspond to a "virtual antenna" whose transmitted signal is generated—in a manner that the receiver need not necessarily be aware of—as a superposition (a weighted sum) of the signals stemming from a number of physical antennas.

Resource mappers 36 allocate resource elements (time-frequency allocations) for the transmission to UEs 28A and 28B. The outputs of mappers are processed in the present example by respective Orthogonal Frequency Division Multiplexing (OFDM) generators 40, which produce OFDM signals that are transmitted via antenna ports 44 toward the UEs. As noted above, in the present example eNodeB transmits downlink MIMO signals to UEs 28A and 28B in the same time-frequency slot. This MU-MIMO signal can be written as $x=u_1x_1+u_2x_2$, wherein $u_1$ and $u_2$ denote the precoding vectors applied to $x_1$ and $x_2$, respectively.

In the present example, eNodeB 24 comprises a controller 46, which configures and controls the different eNodeB elements. In some embodiments, controller 46 selects the precoding vectors to be applied by precoder 32. Additionally or alternatively, controller makes scheduling decisions, e.g., selects the time-frequency slots for transmitting downlink signals to the different UEs. Further additionally or alternatively, controller 46 selects the modulation and coding (MCS) to be applied in each downlink signals transmitted to the different UEs.

In some embodiments, controller 46 makes the above-described selections and decisions based on feedback that is received from the UEs over the uplink channel. This feedback typically is indicative of the quality of the downlink communication channel, as estimated by the UEs. In an embodiment, eNodeB 24 comprises an uplink receiver 47, which receives uplink signals from the UEs, extracts the UE feedback from the received uplink signals and provides the feedback to controller 46. Several example techniques for calculating the feedback information in the UEs are described hereinbelow.

UE 28A comprises one or more receive (Rx) antenna ports 48, which receive the MU-MIMO signal ($x=u_1x_1+u_2x_2$) transmitted from eNodeB 24. The number of Rx antenna ports is denoted n. In the present example, the UE has two Rx antenna ports, although any other suitable number can also be used.

In an embodiment, a downlink receiver 52 receives the MU-MIMO signal, extracts the specific downlink signal addressed to UE 28A ($x_1$ in the present example), decodes the data carried by this signal and provides the data as output.

UE 28A further comprises a processor 56, which manages and controls the different UE components. In particular, processor 56 comprises a feedback calculation module 60, which calculates feedback information based on the downlink signals received at the UE. In an embodiment, the feedback information is used by the eNodeB in various ways, such as in selecting precoding schemes, selecting appropriate MCSs and/or scheduling downlink transmissions. An uplink transmitter 64 (also referred to as feedback transmitter) transmits the feedback information to eNodeB 24 over the uplink channel. Although the internal UE structure is shown only for UE 28A for the sake of clarity, it is noted that UE 28B has a similar structure.

In some embodiments, feedback calculation module 60 calculates any suitable type of feedback information, such as an feedback based on average block error rate probabilities. In LTE or LTE-A terminology, for example, the feedback may comprise a Channel Quality Indication (CQI), a Precoding Matrix Index (PMI) indicating a preferred precoding matrix for precoding $x_1$, a Precoding Vector Index (PVI) indicating a preferred precoding vector for precoding $x_1$, and/or any other suitable type of feedback. As will be explained in detail below, the feedback calculated by module 60 considers potential interference from components of the MU-MIMO signal that are addressed to other UEs ($x_2$ in the present example). Moreover, in an embodiment, the feedback is calculated explicitly so as to achieve a certain average Block Error Probability (BLER) in receiving $x_1$. As a result, the potential interference is accounted for accurately. Based on such a feedback, the eNodeB is able to select precoding schemes, choose modulation and coding, and/or make scheduling decisions in a manner that achieves the desired average BLER at the UE.

The system configuration shown in FIG. 1 is a simplified example configuration, which is depicted for the sake of conceptual clarity. In alternative embodiments, any other suitable system configuration that calculates and sends feedback based on average error probabilities can also be used. For example, although FIG. 1 shows a single eNodeB and two UEs for the sake of clarity, practical communication systems typically comprise a large number of eNodeBs and UEs. Although the embodiments described herein refer to a MU-MIMO signal that is transmitted to two UEs simultaneously, the techniques described herein can be used with MU-MIMO signals that simultaneously address any desired number of UEs.

In some embodiments, the different components of eNodeB 24 and UEs 28A and 28B are suitably implemented using dedicated hardware, such as using one or more Application-Specific Integrated Circuits (ASICs) and/or Field-Programmable Gate Arrays (FPGAs). Alternatively, some eNodeB and UE components are implemented using software running on general-purpose hardware, or using a combination of hardware and software elements. In particular, controller 46 and/or processor may comprise general-purpose processors, which are programmed in software execute instructions that carry out the functions described herein, although they too may be implemented on dedicated hardware. The software may be downloaded to the processors in electronic form, over a network, for example, or it may, alternatively or additionally, be provided and/or stored on tangible media, such as magnetic, optical, or electronic memory. In some embodiments, some or all of the UE elements (e.g., receiver 52, processor 56 and feedback transmitter 64) may be fabricated in a chip-set. UE and eNodeB elements that are not mandatory for explanation of the disclosed techniques, such as various Radio Frequency (RF) elements, have been omitted from FIG. 1 for the sake of clarity.

As noted above, the MU-MIMO signal transmitted by eNodeB 24 is suitably written as $x=u_1x_1+u_2x_2$. The signal received at UE 28A is suitably written as:

$$y=Hx+n=Hu_1x_1+Hu_2x_2+n \qquad \text{Equation 1}$$

wherein H denotes the m-by-n MIMO channel response between the m Tx antenna ports of eNodeB 24 and the n Rx antenna ports of UE 28A. The term n denotes the channel noise, typically treated as an Additive White Gaussian Noise (AWGN).

Typically, UE 28A calculates the feedback information based on the received signal y. In signal y, however, only the term $Hu_1x_1$ is addressed to UE 28A, and the term $Hu_2x_2$ (addressed to UE 28B) is regarded as interference. In many practical cases, UE 28A is unable to distinguish $Hu_2x_2$ from $Hu_1x_1$. Therefore, the channel estimation made by UE 28A may be distorted and cause inaccurate feedback.

Consider, for example, the actual Signal to Interference and Noise Ratio (SINR) at UE 28A:

$$SINR_{MU} = \frac{|v^H H u_1|^2 \frac{P}{2}}{|v^H H u_2|^2 \frac{P}{2} + N_0 v^H v} \quad \text{Equation 2}$$

wherein v denotes the receive combining vector applied by receiver 52 to the signals received from the different Rx antenna ports. (P denotes the average power of each of signals $Hu_1x_1$ and $Hu_2x_2$.) (P denotes the total available transmit power at eNB). $N_0$ denotes the power density of n. As can be appreciated from Equation 2, direct calculation of $SINR_{MU}$ at UE 28A requires knowledge of $u_2$.

In practice, however, $u_2$ is usually unknown to UE 28A because it pertains to a different UE, namely to UE 28B. Therefore, UE 28A typically is not able to isolate and measure the actual interference caused by signal $Hu_2x_2$, and is not able to calculate $SINR_{MU}$ directly according to Equation 2. Ignoring the contribution of $Hu_2x_2$ to $SINR_{MU}$ would produce an over-optimistic estimate of $SINR_{MU}$. Feedback that is based on such an over-optimistic estimation may cause the eNodeB to select non-optimal precoding schemes and/or MCSs, and may lead to poor downlink performance. The description that follows describes a process for calculating feedback information in UE 28A, in a manner that accounts for the potential interference from MU-MIMO signal components addressed to other UEs.

Figure 2:
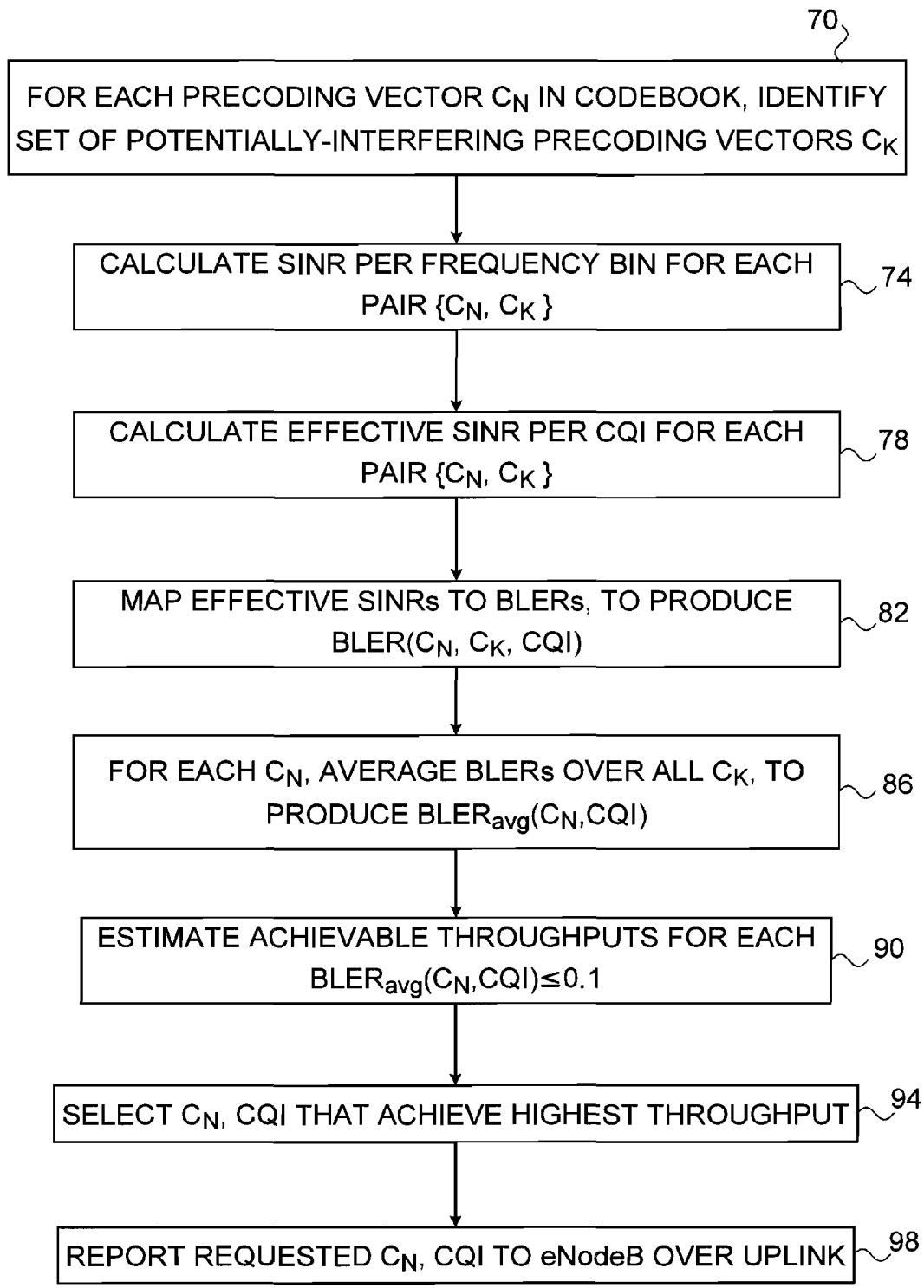
FIG. 2 is a flow chart that schematically illustrates a method for computing channel information feedback in a MU-MIMO communication system, in accordance with an embodiment that is described herein.

FIG. 2 is a flow chart that schematically illustrates a method for computing channel information feedback in MU-MIMO communication system 20, in accordance with an embodiment that is described herein. The method of FIG. 2 is carried out by feedback calculation module 60 in processor 56 of UE 28A. The method attempts to calculate feedback information that (if acted upon properly by the eNodeB) achieves maximal throughput at a certain specified average Block Error Rate (BLER).

The method of FIG. 2 assumes that eNodeB 24 selects the desired precoding vector for transmitting to UE 28A from a predefined list of precoding vectors that are agreed upon between the eNodeB and the UE. This list is referred to as a codebook. The description that follows assumes a B-bit codebook comprising $2^B$ precoding vectors denoted $C_n$, n=1, 2, ..., $2^B$. The eNodeB selects the appropriate code vector from this codebook based on the feedback (e.g., CQI and/or PMI or PVI) sent from UE 28A.

The method begins with an interferer identification operation 70, in which module 60 identifies, for each precoding vector $C_n$, a set of potentially-interfering precoding vectors $C_k$. In other words, assuming signal $x_1$ is precoded with precoding vector $c_n$, module 60 identifies the set of precoding vectors $c_k$ that would cause interference to this signal at UE 28A if they were chosen to precode signal $x_2$. The set of precoding vectors that potentially cause interference to vector $C_n$ is denoted $CInt_n$.

In some embodiments, the set $CInt_n$ comprises all the vectors in the codebook. In alternative embodiments, one or more of the precoding vectors in the codebook is orthogonal to $C_n$, and can therefore be omitted from the set. Further alternatively, the set comprises precoding vectors from another codebook (of the same eNodeB or of another eNodeB), which potentially cause interference to vector $C_n$.

At a SINR calculation operation 74, module 60 calculates an estimated SINR for each possible pair of $\{C_n, C_k\}$ in each frequency bin f. The frequency-dependent SINR is given by:

$$\widetilde{SINR}_{MU}(c_n, c_k, f) = \frac{|v_f^H H_f c_n|^2 \frac{P}{2}}{|v_f^H H_f c_k|^2 \frac{P}{2} + N_0 v_f^H v_f} \quad \text{Equation 3}$$

At an effective SINR calculation operation 78, module 60 calculates the effective SINR for each pair of $\{C_n, C_k\}$ for each CQI granularity. Each CQI granularity comprises F frequency bins. The mapping between the frequency-dependent SINRs of Equation 3 and the effective SINRs typically depends on the MCS, and therefore on the CQI. This mapping is referred to as Effective SINR Mapping (ESM). Thus, for each CQI, module 60 calculates an effective SINR given by $$\widetilde{SINR}_{eff}(c_n, c_k, CQI=q) = ESM_q \begin{bmatrix} \widetilde{SINR}_{MU}(c_n, c_k, f_1), \\ \widetilde{SINR}_{MU}(c_n, c_k, f_2), \dots, \\ \widetilde{SINR}_{MU}(c_n, c_k, f_F) \end{bmatrix} \quad \text{Equation 4}$$

An example of an ESM that can be used by module 60 is described in 3GPP Technical Standard TS 25.892, entitled "Feasibility Study for Orthogonal Frequency Division Multiplexing (OFDM) for UTRAN enhancement (Release 6)," version 6.0.0, June, 2004, section A.4.3.2, which is incorporated herein by reference. Alternatively, however, any other suitable effective SINR mapping can also be used. At this stage, module 60 has calculated a single effective SINR value for each triplet $\{C_n, C_k, CQI=q\}$.

At a BLER mapping operation 82, module 60 maps each effective SINR to a respective BLER value, which also depends on the CQI. In some embodiments, module 60 computes:

$$\widetilde{BLER}_{MU}(c_n, c_k, q) = g_q[\widetilde{SINR}_{eff}(c_n, c_k, q)] \quad \text{Equation 5}$$

wherein $g_q$ denotes the mapping from SINR to BLER for CQI=q.

At a BLER averaging operation 86, for each precoding vector $c_n$, module 60 averages the BLER values $\widetilde{BLER}_{MU}(c_n, c_k, q)$ over all the potentially-interfering vectors in $CInt_n$. This averaging operation produces an average BLER value for each precoding vector $c_n$ and CQI granularity q:

$$\widetilde{BLER}_{avg}(c_n, q) = \sum_{c_k \in CInt_n} \widetilde{BLER}_{MU}(c_n, c_k, q) \quad \text{Equation 6}$$

Equation 6 reflects the average BLER that is expected in decoding $x_1$ by UE 28A, assuming that $x_1$ is precoded with $c_n$ and that $x_2$ may be precoded with any $c_k$ in $CInt_n$ with equal probability.

Module 60 now selects the average BLER values that do not exceed a certain BLER value. In the present example, module 60 selects the average BLER values that do not exceed 0.1, although any other suitable threshold can also be used. The BLER≤0.1 criterion is specified, for example, in 3GPP Technical Standard TS 25.214, entitled "$3^{rd}$ Generation Partnership Project—Technical Specification Group Radio Access Network—Physical Layer Procedures (FDD) (Release 8)," version 8.5.0, March, 2009, section 6.A.2, which is incorporated herein by reference. At a throughput estimation operation 90, module 60 estimates the achievable throughput for each selected average BLER, i.e., for each $\overline{BLER}_{avg}(c_n,q) \leq 0.1$. In an embodiment, the average throughput can be calculated by:

$$TPut(c_n,q)=(1-\overline{BLER}_{avg}(c_n,q))TPut(CQI=q) \qquad \text{Equation 7}$$

wherein TPut(CQI=q) denotes the achievable throughput for the MCS corresponding to CQI=q with no decoding errors. In alternative embodiments, module 60 calculates the achievable throughput in any other suitable way.

At a maximum throughput selection operation 94, module 60 selects the pair $\{c_n, CQI=q\}$ that achieves the highest throughput according to Equation 7. As noted above, CQI=q is indicative of a certain MCS. Therefore, the selected pair $\{c_n, CQI=q\}$ indicates the preferable precoding vector and the preferred MCS, which are expected to achieve the maximum throughput at an average BLER that does not exceed 0.1. The BLER is averaged over the set of precoding vectors that potentially cause interference to the selected precoding vector $c_n$.

Having selected the preferred precoding vector $c_n$ and CQI, UE 28A reports this information to eNodeB 24 using uplink transmitter 64, at a feedback transmission operation 98. The UE may send the feedback information in any desired format, e.g., CQI and PMI or PVI. The eNodeB receives the feedback information using uplink receiver 47. Controller 46 in the eNodeB may control the downlink transmission in any suitable way based on the received feedback. For example, in an embodiment, controller 46 selects the precoding vector (e.g., PMI or PVI) reported in the feedback. As another example, controller 46 selects the MCS that corresponds to the channel quality (e.g., CQI) reported in the feedback. As yet another example, controller 46 schedules the downlink transmission to UE 28A (e.g., selects the time-frequency allocation for this transmission) based on the received feedback.

The average BLER calculation is in no way limited to the specific process described in FIG. 2. In alternative embodiments, module 60 calculates the average BLERs for the different precoding vectors $c_n$ in any other suitable way. In some embodiments, some or even all of operations 70-94 in FIG. 2 are carried out by controller 46 in eNodeB 24, assuming the eNodeB has sufficient channel information.

In some embodiments, module 60 calculates the average BLER over only a subset of the potentially-interfering vectors $C_k$ in $CInt_n$. This subset is denoted $\tilde{C}Int_n \subset CInt_n$. Module 60 then calculates the feedback information by applying the method of FIG. 2 to the precoding vectors in $\tilde{C}Int_n$ instead of to the entire set $CInt_n$.

In an embodiment, module 60 selects the subset $\tilde{C}Int_n$ using any suitable criteria. In an example embodiment, module 60 assigns each precoding vector $C_k$ in $CInt_n$ a metric defined as $\arg\|Hc_k\|^2$, and selects the vectors to be included in subset $\tilde{C}Int_n$ based on these ranks. Alternatively, however, any other suitable ranking can be used. In some embodiments, module 60 includes in $\tilde{C}Int_n$ the precoding vectors having median values of the rank. In the present context, the term "vectors having median values of the rank" means the vectors remaining after removing one or more of the vectors having minimal values of the rank, and one or more of the vectors having maximal values of the rank. For example, if $CInt_n$ contains four vectors, module 60 selects the two vectors having the middle values of the rank. If, for example, $CInt_n$ contains three vectors, module 60 selects the one vector having the middle value of the rank.

In alternative embodiments, module 60 includes in the subset $\tilde{C}Int_n$ the K precoding vectors that cause minimal interference to $c_n$, or the K precoding vectors that cause maximal interference to $c_n$.

In some embodiments, eNodeB 24 supports multiple feedback reporting schemes, and configures each UE to report its feedback information according to one of these schemes. Possible reporting schemes suitably comprise, for example on or more of the following schemes:

Calculation of feedback using the method of FIG. 2 above.

Calculation of SINR without considering potential interference from other precoding vectors. This sort of calculation and feedback is proposed, for example, in 3GPP TSG RAN WG1 documents R1-082874 and R1-090328, cited above.

Averaging of SINRs corresponding to various potentially-interfering precoding vectors. This sort of calculation and feedback is proposed, for example, in 3GPP TSG RAN WG1 document R1-090328, cited above.

Calculating SINR based on a single interfering precoding vector, which causes maximal interference according to the rank $\arg\|Hc_k\|^2$. This sort of calculation and feedback is proposed, for example, in 3GPP TSG RAN WG1 document R1-082874, cited above.

Calculating SINR based on a single interfering precoding vector, which causes minimal interference according to the rank $\arg\|Hc_k\|^2$. This sort of calculation and feedback is proposed, for example, in 3GPP TSG RAN WG1 document R1-090926, cited above.

In some embodiments, eNodeB 24 selects one or more of the available feedback reporting schemes for a given UE. The eNodeB configures the UE to calculate and report its feedback using the selected scheme or schemes. The eNodeB suitably configures the UE, for example, using Radio Resource Control (RRC) signaling or using any other suitable signaling interface.

In any feedback reporting scheme, the evaluated precoding vectors $c_n$ and the potentially-interfering precoding vectors $c_k$ are selected from the entire codebook or from a subset of the codebook (e.g., a group of precoding vectors that are orthogonal to the rest of the vectors in the codebook). Alternatively, $c_n$ and $c_k$ are selected from different (possibly mutually-orthogonal) subsets of a given codebook, or from different codebooks. In some embodiments, the eNodeB configures a given UE with the sets or subsets of precoding vectors from which $c_n$ and $c_k$ are to be selected. In an embodiment, this configuration is carried out using RRC signaling or any other suitable signaling. Each UE then calculates and reports its feedback using the sets or subsets of precoding vectors designated to it by the eNodeB.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for signal processing in a receiver, the method comprising:

in the receiver, receiving a Multi-User Multiple-Input Multiple-Output (MU-MIMO) signal comprising at least a first signal, which is precoded using a first precoding scheme and is addressed to the receiver, and a second signal, which is precoded using a second precoding scheme;

computing in the receiver an average error rate achievable in decoding the first signal in the presence of the second signal, wherein the average error rate is computed over only a partial subset of a set of possible choices of the second precoding scheme;

selecting the first precoding scheme from among a plurality of available precoding schemes so as to satisfy a criterion defined over the average error rate; and sending from the receiver to a transmitter transmitting the first signal feedback, which depends on the selected first precoding scheme and causes the transmitter to control transmission of the first signal.

2. The method according to claim 1, wherein sending the feedback comprises sending a request to precode the first signal using the selected first precoding scheme.

3. The method according to claim 1, wherein sending the feedback comprises sending a Channel Quality Index (CQI), which is computed based on the selected first precoding scheme.

4. The method according to claim 1, wherein sending the feedback comprises causing the transmitter to modulate and encode the first signal based on the feedback.

5. The method according to claim 1, wherein sending the feedback comprises causing the transmitter to schedule the transmission of the first signal based on the feedback.

6. The method according to claim 1, and comprising configuring the feedback at the receiver based on instructions received from the transmitter.

7. The method according to claim 1, wherein selecting the first precoding scheme comprises choosing the first precoding scheme that minimizes the average error rate over the plurality of the available precoding schemes.

8. The method according to claim 1, wherein selecting the first precoding scheme comprises choosing the first precoding scheme that achieves a maximum throughput among a subset of the available precoding schemes that do not exceed a predefined average error rate value.

9. The method according to claim 1, wherein computing the average error rate comprises calculating respective Signal to Interference and Noise Ratios (SINRs) for a given first precoding scheme and for the possible choices of the second precoding scheme, mapping the SINRs to respective error rates, and averaging the error rates.

10. The method according to claim 1, wherein calculating the average error rate comprises assigning respective ranks to the possible choices of the second precoding scheme, and including in the subset one or more of the possible choices having median values of the ranks.

11. A communication apparatus, comprising:

a receiver, which is configured to receive a Multi- User Multiple-Input Multiple-Output (MU-MIMO) signal comprising at least a first signal, which is precoded using a first precoding scheme and is addressed to the receiver, and a second signal, which is precoded using a second precoding scheme;

a processor, which is configured to compute an average error rate achievable in decoding the first signal in the presence of the second signal, wherein the average error rate is computed over only a partial subset of a set of possible choices of the second precoding scheme, and to select the first precoding scheme from among a plurality of available precoding schemes so as to satisfy a criterion defined over the average error rate; and a feedback transmitter, which is configured to transmit feedback that depends on the selected first precoding scheme, for controlling transmission of the first signal.

12. The apparatus according to claim 11, wherein the transmitter is configured to send at least one feedback type selected from a group of types consisting of a request to precode the first signal using the selected first precoding scheme, and a Channel Quality Index (CQI) computed based on the selected first precoding scheme.

13. The apparatus according to claim 11, wherein the processor is configured to configure the feedback based on instructions received from the transmitter.

14. The apparatus according to claim 11, wherein the processor is configured to choose the first precoding scheme so as to minimize the average error rate over the plurality of the available precoding schemes.

15. The apparatus according to claim 11, wherein the processor is configured to choose the first precoding scheme so as to maximize a throughput, among a subset of the available precoding schemes that do not exceed a predefined average error rate value.

16. The apparatus according to claim 11, wherein the processor is configured to calculate respective Signal to Interference and Noise Ratios (SINRs) for a given first precoding scheme and for the possible choices of the second precoding scheme, to map the SINRs to respective error rates, to average the error rates, and to evaluate the criterion with respect to the averaged error rates.

17. A mobile communication terminal comprising the apparatus of claim 11.

18. A chipset for processing signals in a mobile communication terminal, comprising the apparatus of claim 11.

* * * * *